July 19, 1932.  C. R. PATON  1,867,753
AUTOMOBILE CONSTRUCTION
Filed Nov. 28, 1930
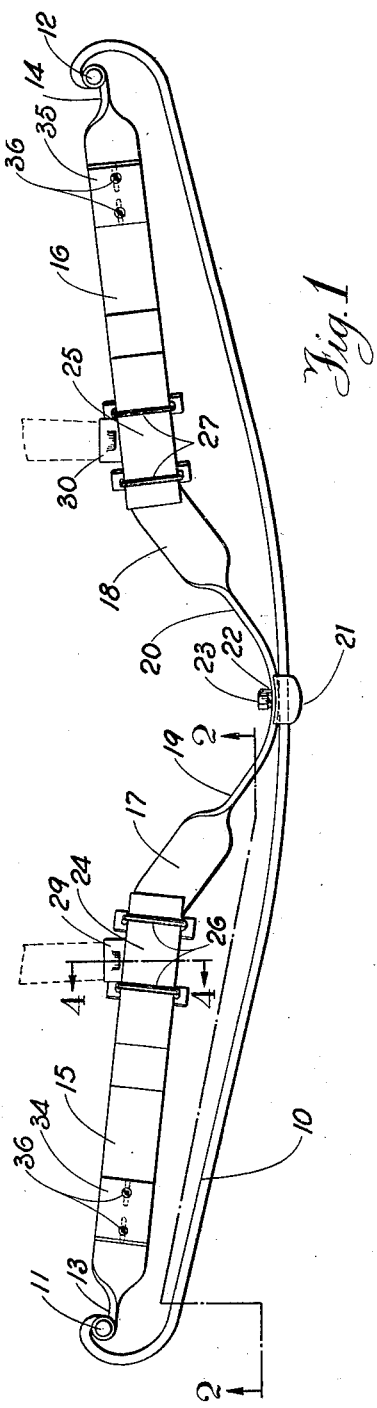
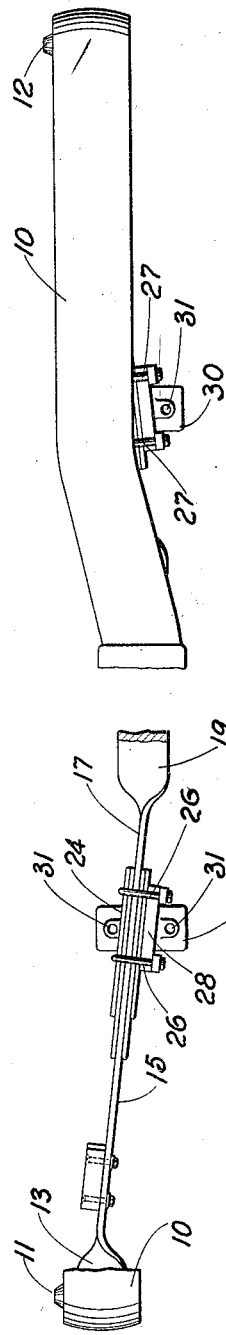
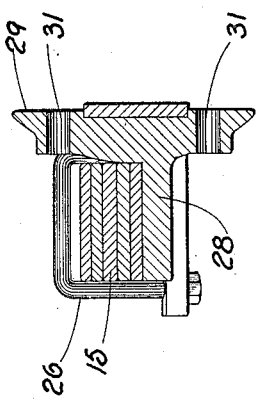
INVENTOR.
Clyde R. Paton
BY P. W. Pomeroy
ATTORNEYS.

Patented July 19, 1932

1,867,753

UNITED STATES PATENT OFFICE

CLYDE R. PATON, OF BIRMINGHAM, MICHIGAN, ASSIGNOR, BY MESNE ASSIGNMENTS, TO PACKARD MOTOR CAR COMPANY, OF DETROIT, MICHIGAN, A CORPORATION OF MICHIGAN

AUTOMOBILE CONSTRUCTION

Application filed November 28, 1930. Serial No. 498,708.

This invention relates to automobile construction and refers particularly to elimination of the vibratory movements commonly termed road vibration or shimmy.

It is an object of the invention to neutralize or absorb the energy tending to cause shimmy in an automobile.

It is a further object of the invention to neutralize the forces tending to cause shimmy by creating opposing forces of the same order of magnitude.

Another object relates to the dampening of road vibration by associating with an automobile constituting a primary vibratory system, a second vibratory system whose vibrations oppose and neutralize the vibrations of the primary system.

Another object of the invention comprises the provision in combination with those parts of an automobile which are subject to shimmy vibration, of resiliently supported masses which operate in sympathy with and in opposite phase with the shimmy vibrations, and which are designed to be of such porportions as to effectively absorb such vibrations at their inception.

Another object relates to bumper construction including means for absorbing shimmy vibration. More specifically this object relates to the provision of resilient means supported on the bumper and having a natural period of vibration capable of dissipating energy created by road vibration.

A specific object resides in the provision of resilient means forming a portion of a bumper support, which resilient means is adapted to vibrate in opposition to shimmy vibrations set up in an automobile.

Other objects of the invention will be indicated in the detailed description of the invention and in the claims.

In the drawing which illustrates a preferred form of the invention:

Figure 1 is a top plan view of a construction embodying the features of the invention.

Figure 2 is a view taken along section lines 2—2 of Figure 1.

Figure 3 is a front elevation of the right hand half of the assembly shown in Figure 1.

Figure 4 is a detail sectional view taken on the line 4—4 of Figure 1, showing a preferred form of mounting the bumper on the vehicle.

Practically every automobile operator has become acquainted with the phenomenon of shimmy or road vibration, particularly since the advent of balloon tires, and in spite of continued effort on the part of manufacturers to eliminate the occurrence of shimmy vibration in motor vehicle operation.

When road shock or vibration is transmitted to an automobile, there is set up a primary vibration system constituting the chassis, vehicle frame, body and associated elements. The initial forces tending to cause shimmy are usually rather small, but under certain conditions, they build up to an extent where a noticeable shimmy and even a violent torsional vibration of the whole automobile occurs. In accordance with the practice of my invention, while not eliminating the effective cause of shimmy, I have substantially eliminated the effect thereof without adding materially to the weight of the automobile or to its cost of manufacture.

According to my invention, there is created a secondary vibratory system which opposes the effect of vibrations induced into the primary vibratory system. In the secondary vibratory system, vibrations are adapted to be created by energy transmitted from the primary system, which vibrations are in sympathy with and in opposite phase with respect to the oscillations of the primary system. The vibrations in the secondary system have a frequency and amplitude approximating those of the vibrations in the primary system, thus effectively absorbing the energy transmitted from the primary system, and dampening the primary oscillations. The frequency of the secondary vibrations may be equal to or less than the frequency of the primary vibrations, and the amplitude of the secondary vibrations may be equal to or preferably somewhat greater than the vibrations of the primary system. Frictional means are provided for frictionally resisting the vibrations of the secondary system in order to dissipate the energy tending to cause shimmy in the primary system.

Referring to the drawing, there is illustrated a bumper construction having an impact bar 10 vertically pivoted at both ends by means of pins 11 and 12, to the vertically disposed portions 13 and 14 of the back bar having resilient horizontally disposed portions 15 and 16, which may be provided, if desired, with forwardly extending portions 17 and 18, which are twisted to form vertically disposed extensions 19 and 20 fastened to the center of impact bar 10 by means of plate 21, washer 22 and nut 23. The inner ends of vertical extensions 19 and 20 are preferably made integral with each other to form a single back bar for the bumper.

The portions 15 and 16 of the back bar are adapted to form elements in multiple leaf spring assemblies 24 and 25 and preferably constitute the central leaves of the assemblies. As best illustrated in Figure 4, the leaves of the spring assemblies are clamped together in a conventional manner by means of U-bolts 26 and 27 to plates 28 extending outwardly from brackets 29 and 30 adapted to be fastened to the front end of a vehicle frame by means of bolts inserted through holes 31 formed in the brackets.

Weights 34 and 35 are adjustably mounted in the portions 15 and 16 and are secured in adjusted position by the bolts 36 extending through slots formed in the back bar as shown in Figure 1. It is preferable to provide weights on the back bar so that the mass can be readily balanced or proportioned relative to the stationary or rigid part of the vehicle as will be understood from other parts of this specification.

Torsional vibrations set up in the primary vibratory system comprising the chassis, vehicle frame, body and associated elements impart energy to the bumper assembly, setting up vibrations in the bumper assembly which will diminish, dampen or eliminate the vibrations in the primary system.

The resilient members 15 and 16 form a series of cantilevers weighted by the weights 34 and 35 and impact bar 10 and adapted to vibrate in opposite phase relative to the vibrations in the primary system. The amplitude and frequency of vibration of the cantilevers are controlled by the length of the lever arms between the brackets and the points of attachment to the impact bar 10, by their degree of resiliency, and by the friction between the leaves of the springs, and by dimensional characteristics.

The initial forces tending to cause shimmy are relatively small, but rapidly build up to a point where the shimmy is noticeable and frequently increase to such proportions as to cause violent torsional movements of the whole automobile. If these forces are checked at their inception they are prevented from increasing to a point where shimmy is apparent. I have found that the magnitude of the forces necessary for checking the initial forces tending to cause and to dissipate the energy created thereby need not be great, and the amplitude of opposing vibrations may be of a low order.

The friction between the leaves of the springs in the bumper construction may be relatively slight, and the weight imposed on the cantilever arms of members 15 and 16 need not be excessive.

The extent of resilient members 15 and 16 between the points of support and the points at which the impact bumper 10 is attached is preferably relatively long to insure an amplitude of vibration greater than the amplitude of the vibrations of the primary system, in order to create a rapid dampening effect and the period of vibration of the spring cantilever arms is preferably made equal to or slightly less than the resultant period of vibration of the primary system by suitable proportioning the length, resiliency and other characteristics of the spring arms or by adjusting the weights 34 and 35 thereon. Upon shimmy vibration in the primary system, the impact bar 10 will vibrate in sympathy therewith and in opposite phase, and the vibrations being of sufficient frequency and amplitude will quickly absorb the vibrations of the primary system.

It will be appreciated that the construction described and illustrated as the preferred form may be varied to a considerable extent without departing from the concept of the invention. If desired, resilient members 15 and 16 may be attached to the bumper bar 10 only at the outer ends thereof or only at the inner ends thereof, or the resilient back bar may be fastened to the vehicle frame at the vertical center line of the bumper, its outer ends freely supporting the impact bar. These and other changes in shape, design and proportions are considered to be embraced within the purview of the invention.

Having thus described my invention, I claim:

1. A bumper construction for use in motor vehicles comprising means for fastening the bumper in position on a vehicle, an impact bar, means mounted on the fastening means and having a portion thereof resilient in substantially a vertical plane when the bumper is mounted in position on the vehicle, and means for supporting the impact bar from said resilient means.

2. A bumper construction for use in motor vehicles comprising means disposed on each side of the vehicle for fastening the bumper in position on a vehicle, an impact bar, resilient means mounted on each of the fastening means and having a portion thereof freely movable in substantially vertical planes when the bumper is mounted in position on the vehicle, and means for supporting the impact bar from the freely movable portions of the resilient means.

3. A bumper construction for use in motor vehicles comprising means disposed on each side of the vehicle for fastening the bumper in position on a vehicle, an impact bar, resilient means mounted on each of the fastening means and having a portion thereof at either side of each of the fastening means freely movable in substantially vertical planes when the bumper is mounted in position on the vehicle, and means for supporting the impact bar from the freely movable portions of the resilient means.

4. A bumper construction for use in motor vehicles comprising means for fastening the bumper in position on a vehicle, an impact bar, leaf spring means mounted on the fastening means, resilient portions thereof being adapted to move in substantially vertical planes when the bumper is in position on the vehicle, and means for supporting the impact bar from a resilient portion of the leaf spring means.

5. A bumper construction for use in motor vehicles comprising, means disposed on each side of the vehicle for fastening the bumper in position on a vehicle, an impact bar, leaf spring means mounted on each of the fastening means, resilient portions thereof being adapted to move in substantially vertical planes when the bumper is in position on the vehicle, and means for supporting the impact bar on resilient portions of the leaf spring means.

6. A bumper construction for use in motor vehicles comprising, means disposed on each side of the vehicle for fastening the bumper in position on a vehicle, an impact bar, leaf spring means mounted on each of the fastening means, resilient portions thereof being disposed at either side of each fastening means and adapted to move in substantially vertical planes when the bumper is in position on the vehicle, and means for supporting the impact bar on resilient portions of the leaf spring means.

7. A bumper construction for use in motor vehicles comprising means for fastening the bumper in position on a vehicle, an impact bar, a multiple leaf spring mounted on the fastening means, resilient portions thereof being adapted to move in substantially vertical planes when the bumper is in position on the vehicle, and means for supporting the impact bar from a resilient portion of the multiple leaf spring.

8. A bumper construction for use in motor vehicles comprising, means disposed on each side of the vehicle for fastening the bumper in position on a vehicle, an impact bar, multiple leaf springs mounted on each of the fastening means, resilient portions thereof being adapted to move in substantially vertical planes when the bumper is in position on the vehicle, and means for supporting the impact bar on resilient portions of the multiple leaf springs.

9. A bumper construction for use in motor vehicles comprising, means disposed on each side of the vehicle for fastening the bumper in position on a vehicle, an impact bar, multiple leaf springs mounted on each of the fastening means, resilient portions thereof being disposed at either side of each fastening means and adapted to move in substantially vertical planes when the bumper is in position on the vehicle, and means for supporting the impact bar on resilient portions of the multiple leaf springs.

10. A bumper construction for use in motor vehicles comprising means for fastening the bumper to a motor vehicle, an impact bar, a back bar mounted on said fastening means and having an end thereof yieldable in substantially a vertical plane when the bumper is in position on the vehicle, and means for supporting the impact bar from said yieldable end.

11. A bumper construction for use in motor vehicles comprising means disposed on each side of the vehicle for fastening the bumper in position on a vehicle, an impact bar, leaf springs mounted on each of the said fastening means and having ends freely movable in substantially vertical planes when the bumper is in position on the vehicle, and means for supporting the impact bar from said freely movable ends.

12. A bumper construction for use in motor vehicles comprising means disposed on each side of the vehicle for fastening the bumper in position on a vehicle, an impact bar, leaf springs mounted on each of said fastening means and having ends on either side of said fastening means freely movable in substantially verticle planes when the bumper is in position on the vehicle, and means for supporting the impact bar from said freely movable ends.

13. A bumper construction for use in motor vehicles comprising means for fastening the bumper to a motor vehicle, the vehicle adapted to act as a primary vibratory system, an impact bar supported from said fastening means and forming a part of a secondary vibratory system which is adapted to vibrate in sympathy with and in opposition to said primary system whereby to dampen vibrations in said primary system.

14. A bumper construction for use in motor vehicles comprising means for fastening the bumper to a motor vehicle, the vehicle adapted to act as a primary vibratory system, an impact bar, resilient means associated with said fastening means, means for supporting the impact bar from said resilient means, the resilient means and the impact bar being adapted to form elements in a secondary vibratory system which is adapted to vibrate in sympathy with and in opposition to said primary system whereby to dampen vibrations in said primary system.

15. A bumper construction for use in motor vehicles comprising means disposed at each side of the vehicle for fastening the bumper to a motor vehicle, the vehicle adapted to act as a primary vibratory system, an impact bar, resilient means associated with each of the fastening means, means for supporting the impact bar from said resilient means, the resilient means and the bumper being adapted to form elements in a secondary vibratory system which is adapted to vibrate in sympathy with and in opposition to said primary system whereby to dampen vibrations in said primary system.

16. In a motor vehicle, the combination of the vehicle frame, and a bumper mounted thereon and having as an integral part thereof a vertically resilient and weighted portion adapted to dampen torsional vibrations of the vehicle.

17. In a motor vehicle, the combination of the vehicle frame, and a bumper mounted thereon and comprising impact and back bars, one of said bars being vertically resilient and the other being connected thereto and forming a weighted member to dampen torsional vibrations of the vehicle.

18. In a motor vehicle, the combination of the vehicle frame and a bumper mounted thereon and forming as an integral part thereof a secondary vibratory system for damping or neutralizing torsional vibrations of the vehicle.

19. A motor vehicle bumper construction comprising an impact bar and a back bar, said bars being connected, one of said bars being formed to yield vertically and providing a vibratory mass.

20. A bumper construction comprising impact and back bars, connections between the bars at their middle and at their ends, one of said bars being flexible vertically, for the purpose set forth.

21. A bumper construction comprising a single piece back bar and a single piece impact bar, said back bar being connected to the impact bar at the middle and at both ends, said back bar being resilient vertically and having reinforcing spring plates.

Signed by me at Birmingham, Michigan this 21st day of November, 1930.

CLYDE R. PATON.